(12) United States Patent
Chen et al.

(10) Patent No.: US 11,262,595 B2
(45) Date of Patent: Mar. 1, 2022

(54) WEARABLE DEVICE AND ITS PIVOTING MODULE

(71) Applicant: Quanta Computer Inc., Taoyuan (TW)

(72) Inventors: Chun-Lung Chen, Taoyuan (TW);
Yuan-Peng Yu, Taoyuan (TW);
Hung-Chieh Wu, Taoyuan (TW);
Chang-En Tsai, Taoyuan (TW);
Yu-Chun Tsai, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 397 days.

(21) Appl. No.: 16/582,060

(22) Filed: Sep. 25, 2019

(65) Prior Publication Data

US 2020/0348535 A1     Nov. 5, 2020

(30) Foreign Application Priority Data

May 3, 2019    (TW) ................. 108115455

(51) Int. Cl.
*G02C 5/22* (2006.01)
*F16C 11/04* (2006.01)
*F16C 11/10* (2006.01)

(52) U.S. Cl.
CPC ............... *G02C 5/22* (2013.01); *F16C 11/04* (2013.01); *F16C 11/10* (2013.01)

(58) Field of Classification Search
CPC ....... Y10T 16/54025; Y10T 16/540254; Y10T 16/540255; Y10T 16/540256; Y10T 16/540257; E05D 11/1078; E05D 11/1007; E05D 11/1014; E05D 2011/1092; E05D 2011/1035; E05D 5/12; G02C 5/2218; G02C 5/2236; G02C 5/22; G02C 5/2227; G02C 5/14; G02C 5/162209; G02C 5/2254; G02C 5/2263; G02C 5/2272; G02C 5/2281; G02C 5/229; G02C 2200/06; G02C 2200/20
See application file for complete search history.

(56) References Cited

U.S. PATENT DOCUMENTS

| | | | | | |
|---|---|---|---|---|---|
| 1,683,814 | A | * | 9/1928 | Block | ..................... E05D 11/06 16/353 |
| 4,186,905 | A | * | 2/1980 | Brudy | ................... B60R 1/0617 16/321 |
| 4,501,045 | A | * | 2/1985 | Boyer | ..................... E05D 11/06 16/331 |
| 5,168,601 | A | * | 12/1992 | Liu | ........................... B62B 9/20 16/329 |

(Continued)

FOREIGN PATENT DOCUMENTS

| CN | 101449198 | 6/2009 |
|---|---|---|
| TW | M501575 | 5/2015 |

*Primary Examiner* — Chuck Y Mah (57) ABSTRACT

A wearable device includes a frame, two feet, and two pivoting modules. Each of the pivoting modules includes a first bracket fixedly connected to the frame, and a second bracket fixedly connected to one of the feet and pivotally coupled to the first bracket. The second bracket includes a positioning member and an inserting member. The positioning member is located in the first bracket, and the positioning member includes a plurality of slots. The inserting member is switchably inserted into one of the slots for adjusting a maximum outreaching volume from the frame to the feet.

10 Claims, 7 Drawing Sheets

(56) References Cited

U.S. PATENT DOCUMENTS

| | | | | |
|---|---|---|---|---|
| 6,618,901 B1* | 9/2003 | Wang-Lee | G02C 5/2263 | 16/228 |
| 6,629,801 B2* | 10/2003 | Cheng | B62B 9/203 | 403/101 |
| 8,534,830 B2* | 9/2013 | Taylor | G02C 1/04 | 351/60 |
| 8,732,906 B1* | 5/2014 | Van Gennep | E05D 11/1007 | 16/229 |
| 8,752,247 B2* | 6/2014 | Franchini | E05D 11/105 | 16/334 |
| 8,925,153 B1* | 1/2015 | McGrath | F16C 11/10 | 16/326 |
| 9,534,628 B1* | 1/2017 | Wang | B62B 9/12 | |
| 10,407,958 B1* | 9/2019 | Tsou | E05D 11/1078 | |
| 10,890,023 B2* | 1/2021 | Mccafferty | E05D 7/14 | |
| 2002/0122152 A1* | 9/2002 | Wang-Lee | G02C 5/2263 | 351/119 |
| 2004/0145699 A1* | 7/2004 | Wu | G02C 5/20 | 351/120 |
| 2004/0223115 A1* | 11/2004 | Zancolo | G02C 5/2254 | 351/153 |
| 2006/0213031 A1* | 9/2006 | Niu | G02C 5/2227 | 16/228 |
| 2011/0083300 A1* | 4/2011 | Heger | B60R 1/076 | 16/321 |
| 2013/0212836 A1* | 8/2013 | Jablonski | E05D 3/02 | 16/348 |
| 2015/0368949 A1* | 12/2015 | Smith | E05D 15/26 | 16/326 |
| 2017/0322428 A1* | 11/2017 | Da Col | G02C 5/2281 | |
| 2018/0173006 A1 | 6/2018 | Hu | | |
| 2018/0371813 A1* | 12/2018 | Cherry | E05D 11/1071 | |
| 2019/0186186 A1* | 6/2019 | Tamer | E05D 11/1007 | |

* cited by examiner

WEARABLE DEVICE AND ITS PIVOTING MODULE

RELATED APPLICATIONS

This application claims priority to Taiwan Application Serial Number 108115455, filed May 3, 2019, which is herein incorporated by reference.

BACKGROUND

Field of Disclosure

The present disclosure relates to a wearable device. More particularly, the present disclosure relates to a wearable device capable of changing a maximum spacing between feet of glasses.

Description of Related Art

With the advancement of science and technology, the application of wearable devices worn on the human body has gradually emerged. For example, the head mounted display can be worn on a user's head to provide timely services and operations correspondingly, such as service functions including information, multimedia, recording, photography and/or lighting.

However, the maximum spacing between feet of the current head mounted display cannot be intentionally adjusted, so that the matching adjustment cannot be performed for different head sizes, which in turn results in that the user who is not suitable for the size cannot wear the head mounted display.

For the foregoing reasons, there is a need to solve the above-mentioned problem by providing a wearable device and its pivoting module.

SUMMARY

A wearable device is provided. The wearable device comprises a frame, two feet, and two pivoting modules. Each of the pivoting modules comprises a first bracket and a second bracket. The first bracket is fixedly connected to the frame, and the first bracket comprises a first bracket body and a limiting portion. The first bracket body has a first through hole. The limiting portion is located in the first through hole. The second bracket is fixedly connected to one of the feet, and the second bracket comprises a second bracket body, a positioning member, and an inserting member. The second bracket body is pivotally coupled to the first bracket body. The positioning member is located in the first through hole. The positioning member comprises a cylinder, a stopper, and a plurality of slots. The slots are recessed on the cylinder and are equally spaced around an axis of the first through hole. The stopper is located on an outer wall of the cylinder and is configured to restrict the second bracket body from pivoting when being blocked by the limiting portion. The inserting member is located on the second bracket body, and is switchably inserted into one of the slots. When the inserting member is adjusted to be inserted into another one of the slots, a maximum outreaching volume from the frame to one of the feet is changed.

The disclosure provides a pivoting module. The pivoting module comprises a first bracket and a second bracket. The first bracket comprises a first bracket body, a first connection lug, and a limiting portion. The first connection lug is connected to one side of the first bracket body. The first bracket body has a first through hole. The limiting portion is located in the first through hole. The second bracket comprises a second bracket body, a second connection lug, a positioning member, and an inserting member. The second bracket body is pivotally coupled to the first bracket body. The second connection lug is connected to one side of the second bracket body. The positioning member comprises a cylinder, a stopper, and a plurality of slots. The cylinder is located in the first through hole. The slots are recessed on the cylinder and are equally spaced around an axis of the first through hole. The stopper is located on an outer wall of the cylinder and is configured to restrict the second bracket body from pivoting when being blocked by the limiting portion. The inserting member is located on the second bracket body, and is switchably inserted into one of the slots. When the inserting member is adjusted to be inserted into another one of the slots, a maximum angle between the second connection lug and the first connection lug is changed.

Therefore, the user can adjust the inserting member selectively to insert the inserting member into another slot by using the structure(s) described in the above embodiments. The maximum outreaching volume from the frame to the feet can thus be changed to adjust the maximum spacing between the feet. As a result, the wearable device can be worn on users with different head sizes.

It is to be understood that both the foregoing general description and the following detailed description are by examples, and are intended to provide further explanation of the disclosure as claimed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure. In the drawings.

DESCRIPTION OF THE EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and components are schematically depicted in order to simplify the drawings.

Figure 1:
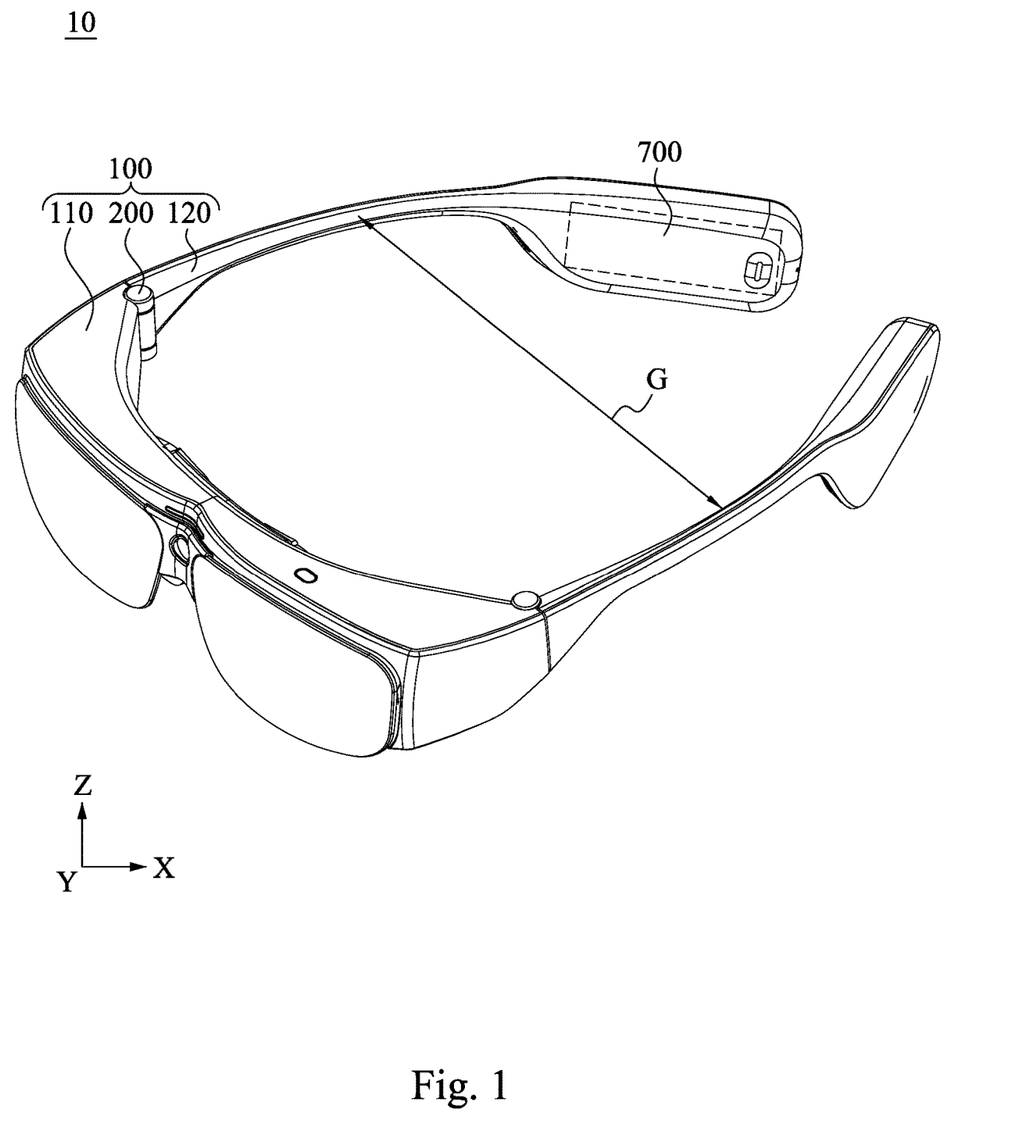
FIG. 1 depicts a perspective view of a wearable device according to one embodiment of this disclosure.

FIG. 1 depicts a perspective view of a wearable device 10 according to one embodiment of this disclosure. As shown in FIG. 1, the wearable device 10 comprises glasses 100 and an electronic device 700 according to the present embodiment. The glasses 100 comprise a frame 110, two feet 120, and two pivoting modules 200. Each of the feet 120 is pivotally connected to one side of the frame 110 through the pivoting module 200, so that each of the feet 120 can pivot relative to the frame 110 to achieve a maximum outreaching volume from the frame 110 to each of the feet 120 that outreaches most. Therefore, the two feet 120 that outreach most have a maximum spacing G. A display and a circuit of the electronic device 700 are respectively located in the frame 110 and the feet 120, and are electrically connected to each other. The above display is, for example, an augmented reality (AR) display or a virtual reality (VR) display.

It is noted that a description of the frame 110 and the feet 120 of the glasses 100 is not provided because the frame 110 and the feet 120 of the glasses 100 are not limited in the present disclosure. In addition, the present disclosure is not limited to the situation that the wearable device 10 must have the electronic device 700.

Figure 2:
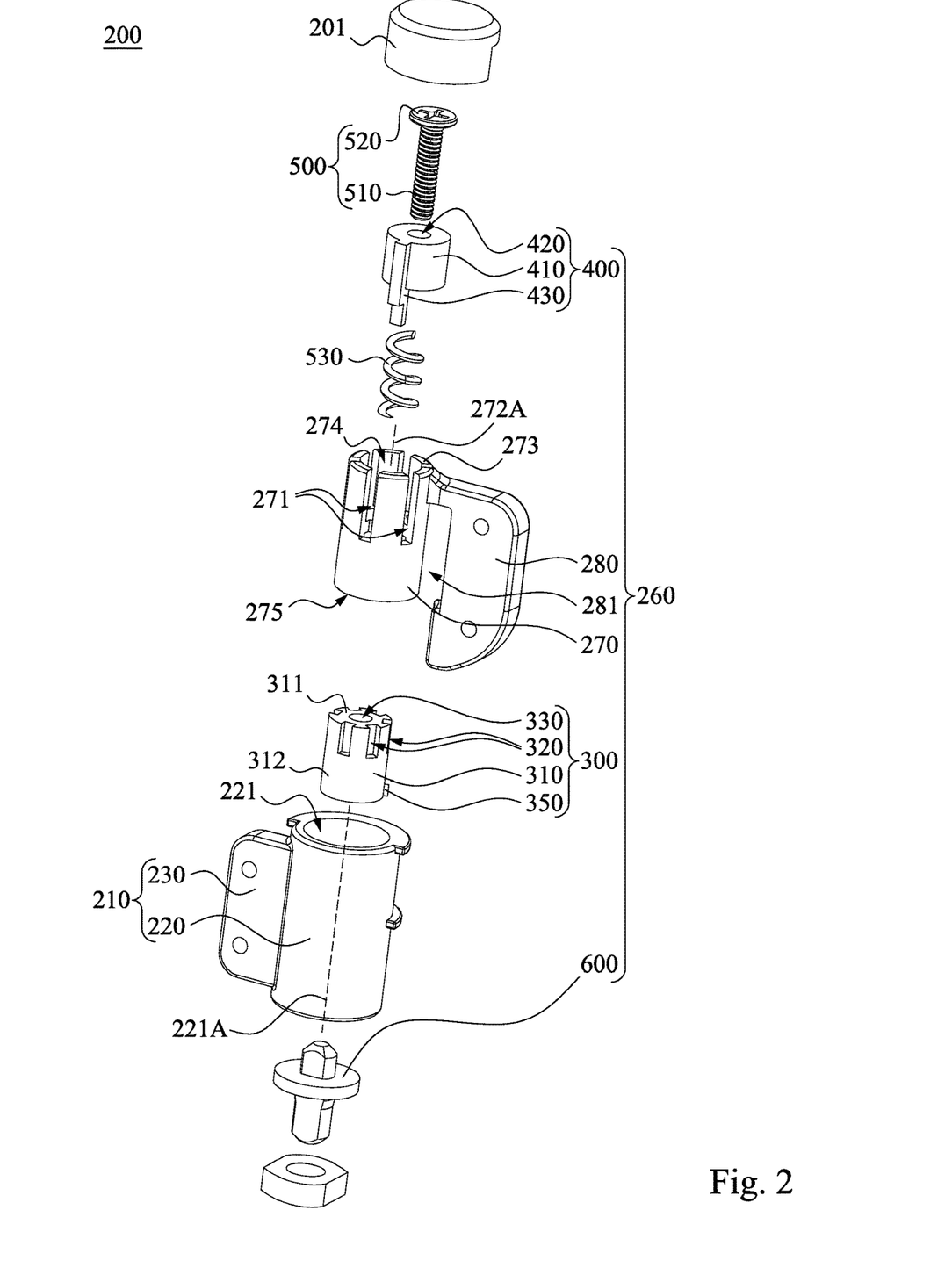
FIG. 2 depicts an exploded view of one of the pivoting modules in FIG. 1.
Figure 3A:
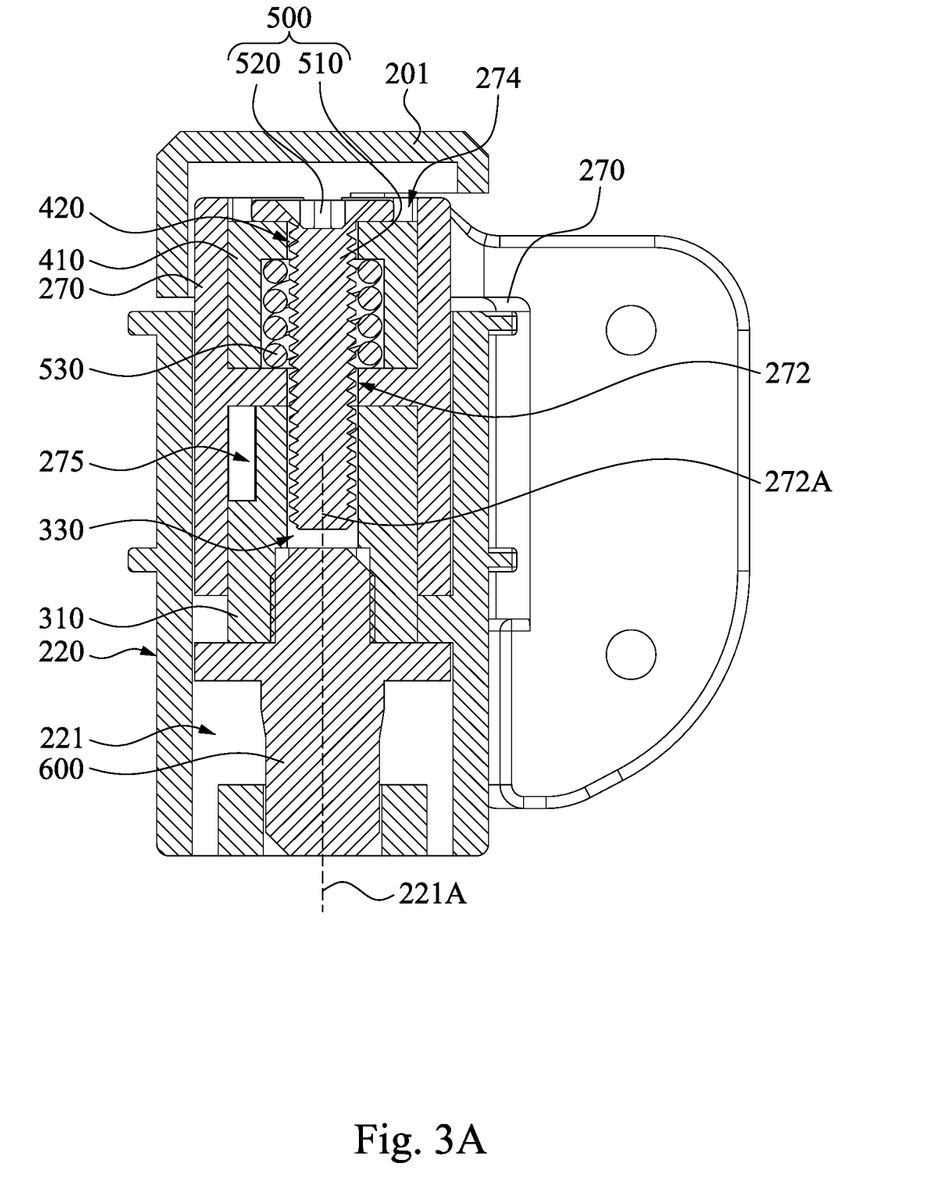
FIG. 3A depicts a longitudinal cross-sectional view of one of the pivoting modules in FIG. 1 along an axial direction Z.
Figure 3B:
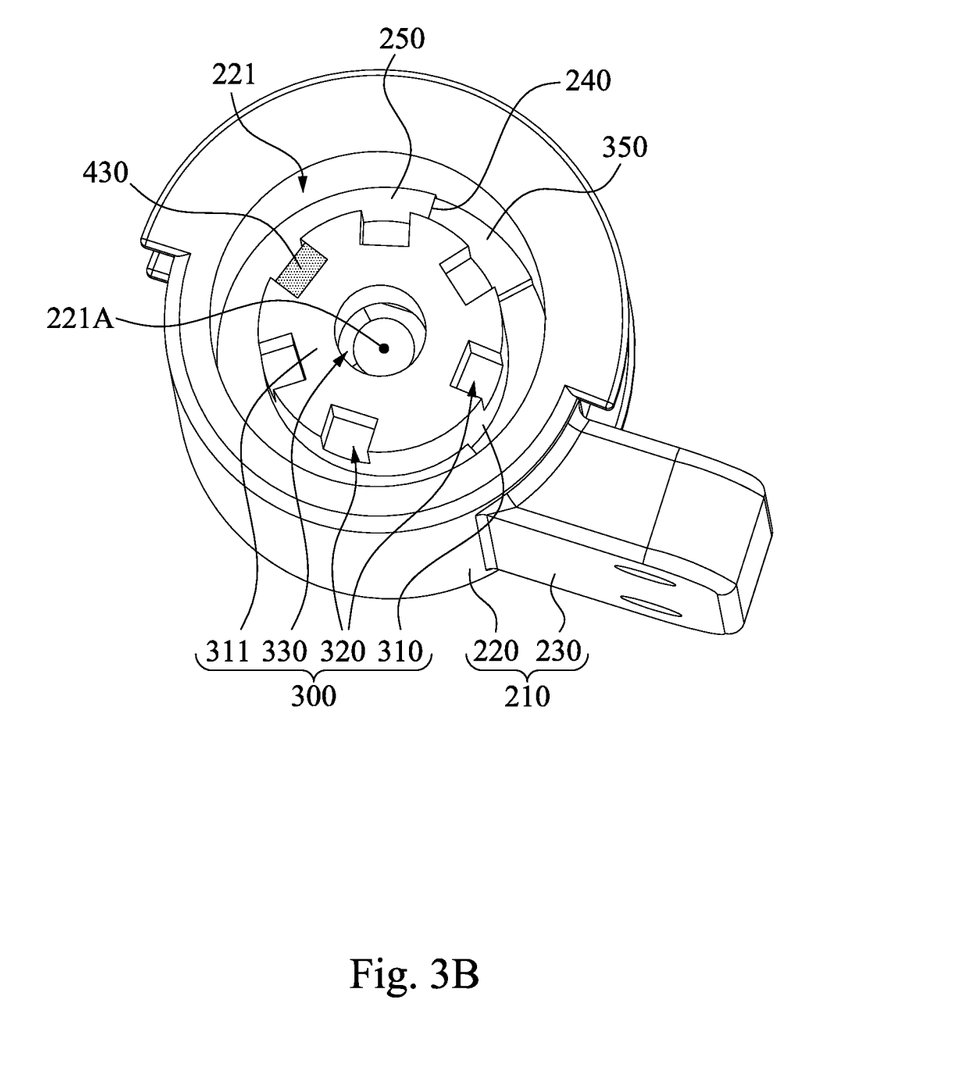
FIG. 3B depicts a transverse cross-sectional view of the pivoting module in FIG. 1 on an X-Y plane.

FIG. 2 depicts an exploded view of one of the pivoting modules 200 in FIG. 1. FIG. 3A depicts a longitudinal cross-sectional view of one of the pivoting modules 200 in FIG. 1 along an axial direction Z. FIG. 3B depicts a transverse cross-sectional view of the pivoting module 200 in FIG. 1 on an X-Y plane. As shown in FIG. 2 and FIG. 3A, each of the pivoting modules 200 comprises a first bracket 210 and a second bracket 260. The first bracket 210 comprises a first bracket body 220 and a first connection lug 230. The first bracket body 220 has a first through hole 221. The first through hole 221 penetrates through two opposite ends of the first bracket body 220. The first connection lug 230 is connected to one side of the first bracket body 220 and is configured to be fixedly connected to the frame 110. The first connection lug 230 is, for example, fastened to the frame 110 through a fastening method.

The second bracket 260 comprises a second bracket body 270, a second connection lug 280, a positioning member 300, and an inserting member 400. The second bracket body 270 is coaxially coupled to the first bracket body 220, and the second bracket body 270 is pivotally coupled to the first bracket body 220, so that the second bracket body 270 pivots relative to the first bracket body 220. The second connection lug 280 is connected to one side of the second bracket body 270 and is configured to be fixedly connected to one of the feet 120. For example, a gap 281 exists between the second connection lug 280 and the second bracket body 270. The second bracket body 270 is pivotally located in the first through hole 221. Hence, the first bracket body 220 extends into the gap 281. The positioning member 300 is located in the first through hole 221 and is fixedly connected to the inserting member 400 and the second bracket body 270, so that the positioning member 300 is linked with the second bracket body 270.

The positioning member 300 comprises a cylinder 310 and a plurality of (for example, six) slots 320. The slots 320 are sequentially recessed at one end of the cylinder 310 and approximately surround an axis 221A of the first through hole 221. In addition, each of the slots 320 is formed on an end surface 311 of the cylinder 310 facing the second bracket body 270 and on a circumferential surface 312 surrounding the cylinder 310 at the same time. In the present embodiment, the slots 320 are equally spaced around the axis 221A of the first through hole 221, however, the present disclosure is not limited in this regard. The inserting member 400 is located on the second bracket body 270, and is switchably inserted into one of the slots 320.

In greater detail, in the present embodiment, however, the present disclosure is not limited thereto, the second bracket body 270 comprises a first recess 274, a second recess 275, a second through hole 272 (as shown in FIG. 3A), and a plurality of (for example, six) slim slots 271. The first recess 274 is recessed on an end surface 273 of the second bracket body 270 being located away from the first bracket 210, and is configured to receive the inserting member 400. The second recess 275 is recessed on another end surface of the second bracket body 270 opposite to the first recess 274, and is configured to receive the positioning member 300. The second through hole 272 is located on a bottom of the first recess 274, and is communicated with the first recess 274 and the second recess 275, and is coaxial with the first through hole 221. In other words, the inserting member 400 and the positioning member 300 are both joined in the second bracket body 270. The slim slots 271 are recessed on the end surface 273 of the second bracket body 270 and approximately surround an axis 272A of the second through hole 272, and are communicated with the second through hole 272 through the first recess 274. Each of the slim slots 271 is coaxially aligned with one of the slots 320. In the present embodiment, the slim slots 271 are equally spaced around the axis 272A of the second through hole 272, however, the present disclosure is not limited in this regard. The pivoting module 200 further comprises a top cover 201 to cover the slim slots 271 and the first recess 274 of the second bracket body 270.

The inserting member 400 comprises an inserting body 410 and an extending rib 430. The inserting member 400 is removably located in the first recess 274 of the second bracket body 270. The extending rib 430 protrudes from one side of the inserting body 410, and is located in the second recess 275, and is switchably inserted into the slim slot 271 and the slot 320 that are coaxially aligned with each other. In this manner, a user can identify the slot 320 correspondingly through selecting a specific slim slot 271 to allow the extending rib 430 of the inserting member 400 to be correctly inserted into the corresponding slot 320 so as to reduce unnecessary operation time.

The inserting member 400 further comprises a fixing bolt 500 and an elastic element 530. The fixing bolt 500 integrally fastens the inserting body 410 of the inserting member 400, the second bracket body 270, and the positioning member 300 into one unit. In greater detail, the cylinder 310 has a through hole 330. The through hole 330 penetrates through two opposite ends of the cylinder 310. The inserting body 410 of the inserting member 400 has a screw hole 420. The screw hole 420 penetrates through two opposite ends of the inserting body 410. The fixing bolt 500 passes through the screw hole 420 of the inserting member 400, the second through hole 272, and the through hole 330 of the positioning member 300, so that the inserting body 410, the second the second bracket body 270, and the positioning member 300 are integrally locked into one unit. A bolt head 520 of the fixing bolt 500 is located outside the screw hole 420 and covers the screw hole 420. The elastic element 530 is located in the first recess 274 and elastically abuts against the second bracket body 270 and the inserting member 400, and is configured to push the inserting body 410 out of the first recess 274.

The elastic element 530 is, for example, a wind spring located within the inserting body 410 and surrounding a stud 510 of the fixing bolt 500. One end of the elastic element 530 is directly connected to the inserting body 410. Another end of the elastic element 530 is directly connected to a bottom surface of the first recess 274 of the second bracket body 270. In this manner, when the fixing bolt 500 fastens the inserting member 400 to the positioning member 300, the inserting member 400 and the second bracket body 270 compress the elastic element 530 and allow the elastic element 530 to store a resilient force in the first recess 274 of the second bracket body 270.

In addition, the second bracket 260 further comprises a damper 600 according to the present embodiment. The damper 600 is located in the first through hole 221 and is fixedly connected to one end of the cylinder 310 opposite to the second bracket 260, and directly contacts an inner wall of the first through hole 221. Hence, the damper 600 is able to reduce a pivot speed of the second bracket body 270 relative to the first bracket body 220 when the second bracket 260 pivots relative to the first bracket 210 since the damper 600 can rub the inner wall of the first bracket body 220.

Figure 4A:
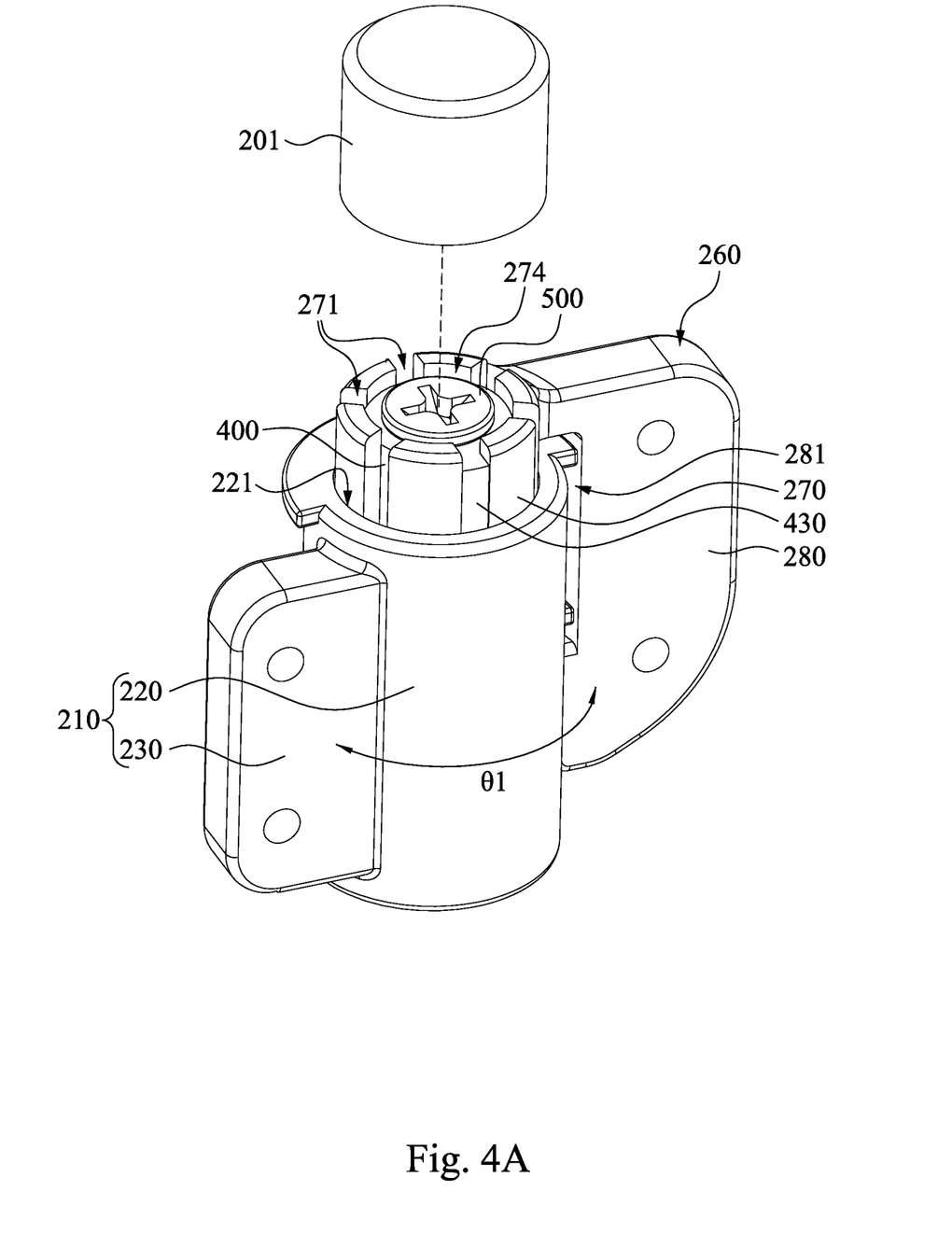
FIG. 4A to FIG. 4C are continuous operation diagrams for adjusting a maximum angle between the frame and the feet by the pivoting module in FIG. 1.

As shown in FIG. 2 and FIG. 3B, the first bracket 210 further comprises a limiting portion 240. The limiting portion 240 is located in the first through hole 221. For example, the limiting portion 240 is one of side walls of an inner rim 250 in the first through hole 221. The positioning member 300 further comprises a stopper 350. The stopper 350 protrudes from an outer wall of the cylinder 310. Hence, the positioning member 300 is linked with the second bracket body 270 when the second bracket 260 rotates relative to the first bracket 210 in the first through hole 221. At this time, once the stopper 350 of the positioning member 300 is moved to one of the limiting portions 240, the limiting portion 240 blocks the positioning member 300, thus restricting the second bracket body 270 from continuing to pivot. Hence, when the second bracket 260 pivots relative to the first bracket 210 to allow the stopper 350 of the positioning member 300 to move to the limiting portion 240, the second bracket 260 drives the feet 120 to outreach most. In this manner, a maximum angle θ1 (as shown in FIG. 4A) exists between the second connection lug 280 and the first connection lug 230. The maximum angle θ1 is approximately equal to the maximum outreaching volume from the frame 110 to the feet 120.

Figure 4B:
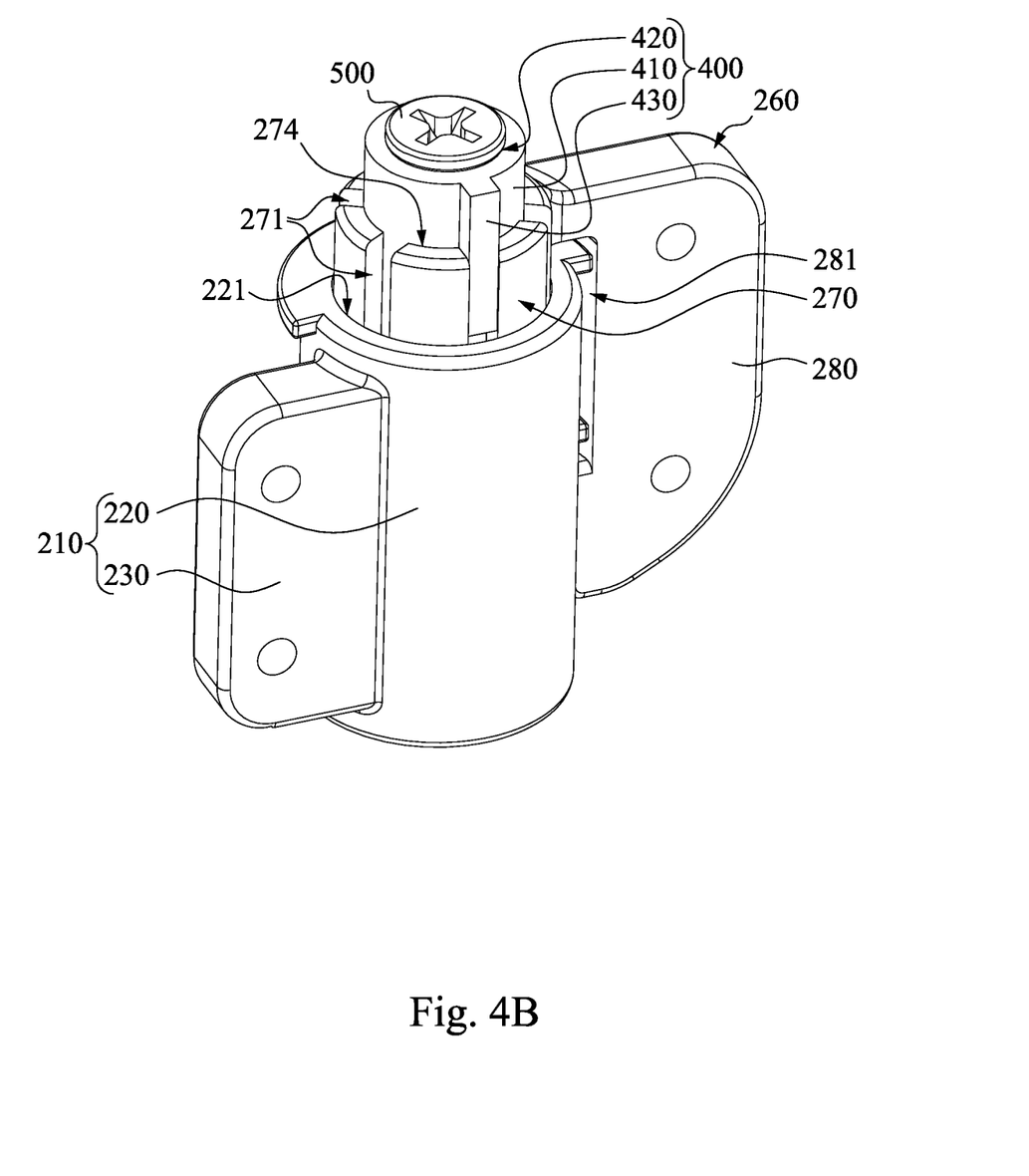
Figure 4C:
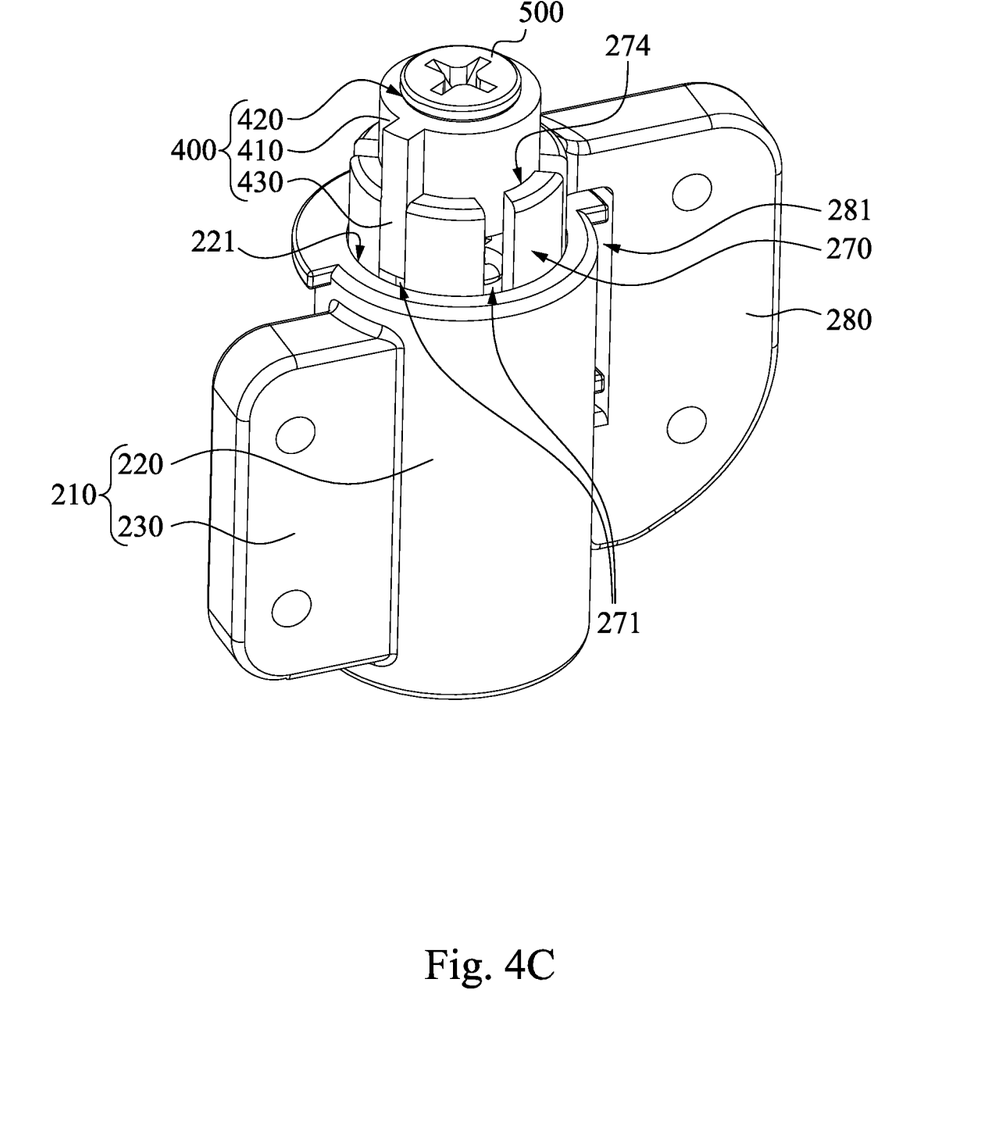

FIG. 4A to FIG. 4C are continuous operation diagrams for adjusting the maximum angle θ1 between the frame 110 and the feet 120 by the pivoting module 200 in FIG. 1. As shown in FIG. 4A and FIG. 4B, when a user wants to adjust the pivoting modules 200 to change the maximum spacing G (as shown in FIG. 1) between the feet 120, the user first removes the top cover 201 and loosens the fixing bolt 500 of each of the pivoting modules 200. At this time, the resilient force of the elastic element 530 (as shown in FIG. 3A) is directed away from the first bracket 210 to push the inserting body 410 out of the first recess 274 of the second bracket body 270 so as to speed up the user's operation.

As shown in FIG. 4B and FIG. 4C, since the inserting body 410 of the inserting member 400 has been pushed out of the first recess 274, the user can rotate the inserting member 400 and select to allow the extending rib 430 to be inserted into another slot 320 (as shown in FIG. 3B) again through another slim slot 271 correspondingly. In this manner, as shown in FIG. 1 and FIG. 4A, the maximum angle θ1 between the second connection lug 280 and the first connection lug 230 can be changed when the feet 120 outreaches relative to the frame 110 (as shown in FIG. 1). That is, the maximum outreaching volume from the frame 110 to the feet 120 can be changed. As a result, the user can change the maximum spacing G between the feet 120 that outreach most to match the size of the user's head.

It is noted that an angle of 60° exists between any two neighboring slots 320 according to the present embodiment since the six slots 320 are equally spaced around the axis 221A of the first through hole 221. Therefore, the user can change the selection by selecting to move forward or backward to insert into at least one slot 320. As a result, the maximum outreaching volume from the frame 110 to each of the feet 120 is changed. However, the present disclosure is not limited in this regard.

Therefore, the user can adjust the inserting member 400 selectively to insert the inserting member 400 into another slot 320 by using the structure(s) described in the above embodiments. The maximum outreaching volume from the frame 110 to the feet 120 can thus be changed to adjust the maximum spacing G between the feet 120. As a result, the wearable device 10 can be worn on users with different head sizes.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A wearable device, comprising:
   a frame;
   two feet; and
   two pivoting modules, each of the pivoting modules comprising:
      a first bracket fixedly connected to the frame, and comprising a first bracket body having a first through hole, and a limiting portion being located in the first through hole; and
      a second bracket fixedly connected to one of the feet, the second bracket comprising a second bracket body, a positioning member, and an inserting member, the second bracket body being pivotally coupled to the first bracket body, the positioning member comprising a cylinder, a stopper, and a plurality of slots, the cylinder being located in the first through hole, the slots being recessed on the cylinder and surrounding an axis of the first through hole, the stopper being located on an outer wall of the cylinder and being configured to restrict the second bracket body from pivoting when being blocked by the limiting portion, the inserting member being located on the second bracket body, and being switchably inserted into one of the slots;
   wherein when the inserting member is adjusted to be inserted into another one of the slots, a maximum outreaching volume from the frame to one of the feet is changed.

2. The wearable device of claim 1, wherein the second bracket body comprises:
   a first recess recessed on an end surface of the second bracket body away from the first bracket, and being configured to receive the inserting member;
   a second recess recessed on the second bracket body and being disposed opposite to the first recess, and being configured to receive the positioning member;
   a second through hole located on a bottom of the first recess, and being communicated with the first recess and the second recess; and
   a plurality of slim slots recessed on the end surface of the second bracket body and surrounding an axis of the second through hole, and being communicated with the first recess, wherein each of the slim slots is coaxially aligned with one of the slots.

3. The wearable device of claim 2, wherein the inserting member comprises:
   an inserting body being removably located in the first recess; and
   an extending rib protruding from one side of the inserting body, and being switchably inserted into one of the slim slots and one of the slots that are coaxially aligned with each other.

4. The wearable device of claim 3, wherein the inserting member comprises:
   a screw hole penetrating through the inserting body, and being coaxial with the second through hole;
   a fixing bolt passing through the screw hole and the second through hole, and fastening the inserting member, the second bracket body, and the positioning member into one unit; and
   an elastic element located in the first recess and elastically abutting against the second bracket body and the inserting member, and being configured to push the inserting body out of the first recess.

5. The wearable device of claim 1, wherein the second bracket further comprises a damper, the damper is located in the first through hole and is fixedly connected to one end of the positioning member opposite to the inserting member, and directly contacts an inner wall of the first through hole for reducing a pivot speed of the second bracket body relative to the first bracket body.

6. A pivoting module, comprising:
   a first bracket comprising:
      a first bracket body having a first through hole;
      a first connection lug connected to one side of the first bracket body; and
      a limiting portion located in the first through hole; and
   a second bracket comprising:
      a second bracket body pivotally coupled to the first bracket body;
      a second connection lug connected to one side of the second bracket body;
      a positioning member comprising a cylinder, a stopper, and a plurality of slots, the cylinder being located in the first through hole, the slots being recessed on the cylinder and surrounding an axis of the first through hole, the stopper being located on an outer wall of the cylinder and being configured to restrict the second bracket body from pivoting relative to the first bracket body when being blocked by the limiting portion; and
      an inserting member located on the second bracket body, and being switchably inserted into one of the slots;
   wherein when the inserting member is adjusted to be inserted into another one of the slots, a maximum angle between the second connection lug and the first connection lug is changed.

7. The pivoting module of claim 6, wherein the second bracket body comprises:
   a first recess recessed on an end surface of the second bracket body away from the first bracket, and being configured to receive the inserting member;
   a second recess recessed on the second bracket body and being disposed opposite to the first recess, and being configured to receive the positioning member;
   a second through hole located on a bottom of the first recess, and being communicated with the first recess and the second recess; and
   a plurality of slim slots recessed on the end surface of the second bracket body and surrounding an axis of the second through hole, and being communicated with the first recess, wherein each of the slim slots is coaxially aligned with one of the slots.

8. The pivoting module of claim 7, wherein the inserting member comprises:
   an inserting body being removably located in the first recess; and
   an extending rib protruding from one side of the inserting body, and being switchably inserted into one of the slim slots and one of the slots that are coaxially aligned with each other.

9. The pivoting module of claim 8, wherein the inserting member comprises:
   a screw hole penetrating through the inserting body, and being coaxial with the second through hole;
   a fixing bolt passing through the screw hole and the second through hole, and fastening the inserting member, the second bracket body, and the positioning member into one unit; and
   an elastic element located in the first recess and elastically abutting against the second bracket body and the inserting member, and being configured to push the inserting body out of the first recess.

10. The pivoting module of claim 6, wherein the second bracket further comprises a damper, the damper is located in the first through hole and is fixedly connected to one end of the positioning member opposite to the inserting member, and directly contacts an inner wall of the first through hole for reducing a pivot speed of the second bracket body relative to the first bracket body.

* * * * *